Figure 1:
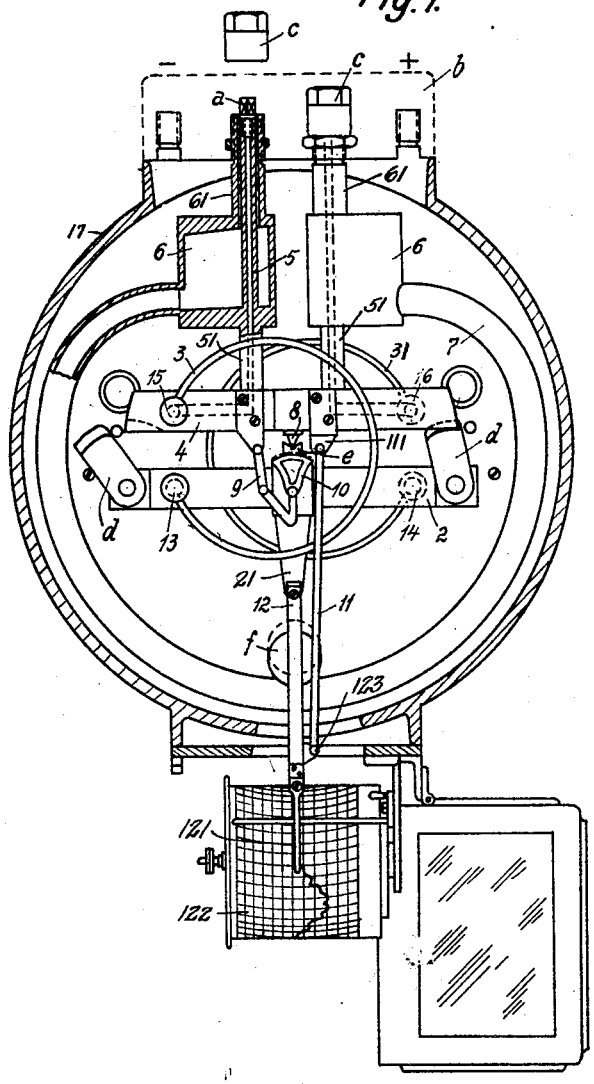

June 9, 1931.  A. RÖVER  1,809,759

PRESSURE GAUGE

Filed March 8, 1928

A. Röver
INVENTOR

By: Marks & Clark
ATT'ys

Patented June 9, 1931

1,809,759

UNITED STATES PATENT OFFICE

ALBERT RÖVER, OF QUEDLINBURG, GERMANY, ASSIGNOR TO STEINLE & HARTUNG, G. M. B. H., OF QUEDLINBURG, GERMANY

PRESSURE GAUGE

Application filed March 8, 1928, Serial No. 260,199, and in Germany March 3, 1926.

This invention relates to liquid level pressure gauges of the type comprising a movable U-tube vessel containing a liquid, such as mercury, the surfaces of which in the two limbs of the U-tube are subjected to different pressures, variations of which displace the liquid in the vessel and thereby move the vessel against a returning force. Such pressure gauges are frequently employed for measuring the flow of liquids or gases through a pipe in the interior of which is arranged a constricting device, such as a perforated diaphragm, a throttling nozzle or a Venturi tube, the two limbs of the U-tube vessel being placed in open communication with the interior of the pipe, one on each side of the constricting device. The difference in the pressures on the two sides of the constricting device in the pipe is indicated or recorded by any suitable means connected to the movable U-tube vessel and the velocity of flow determined therefrom.

In such apparatus there is difficulty in providing a satisfactory connection of the limbs of the U-tube vessel with the points, the pressure difference between which is required to be measured. The use of hollow trunnions for this purpose has been proposed and resilient connecting pipes have also been used. In the case of the former, however, the friction reduces the accuracy of the measurements, while in the case of the latter there are other defects.

According to the present invention, the U-tube vessel, which is curved to the arc of a circle, is secured to a movable beam adapted to rock about a horizontal axis, said beam having passages in its interior, one of which is in open communication with one end of the U-tube vessel and the other in open communication with the other end of the U-tube vessel, arcuate tubular springs each comprising at least two thirds of a circle, being arranged in planes substantially perpendicular to the axis about which the movable beam is adapted to rock, each spring having one end connected to the beam and its interior in open communication with one of the respective passages in the interior thereof, the said ends of the two springs being connected to the beam on opposite sides of the rocking axis of the beam so as to tend to rock the beam in oposite directions, the other ends of the tubular springs being connected to a fixed support and being connected to means for placing them in open communication with the points at different pressures, the difference between which it is required to measure. The planes of curvature of the arcuate tubular springs are parallel to the plane in which the movable beam rocks and the arrangement is such that the said springs are stressed as uniformly as possible over their entire length without putting any additional load on the fulcrum of the beam which comprises a knife-edge bearing.

The invention is illustrated by way of example in the accompanying drawings, in which Figure 1 is a front elevation of the apparatus with the front cover and dial removed to show the interior mechanism.

Figure 2:
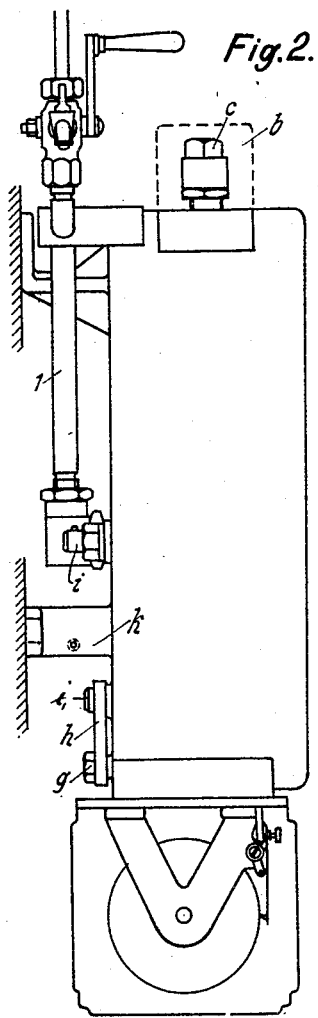

Figure 2 is a side elevation of the apparatus.

Referring to the drawings, 17 is a casing inside of which is a stationary beam 2 which is fixed to the casing by means of two pillars 13, 14 which are passed through the rear wall of the casing. These pillars are hollow and are connected by means of elbow pieces to two vertical tubes 1 which extend at right angles to the pillars, one of said vertical tubes being shown in Figure 2. The left-hand pillar 13 in Figure 1 extends to the front side of the beam 2 but the right hand pillar 14 does not project through the beam. Secured to the beam 2, midway between the pillars 13, 14, is a hanger 21 on the upper end of which is a notch e in which rests a knife-edge 8 fixed to the middle of the movable beam 4.

The U-tube vessel 7 comprises an arcuate steel tube which is bent to about two thirds of a circle and at each end is connected to a catch pot 6 for receiving any excess liquid which may pass out of the ends of the tube. The catch pots 6 are secured to the beam 4 by means of tubular struts 51 which are welded or hard soldered to the bottoms of the catch pots and to the beam 4, one on each side of the knife edge 8. By this means the beam 4, together with the U-tube vessel 7 is adapted to rock as a unit about the horizontal axis formed by the knife-edge bearing 8, e.

Projecting from the catch pots 6 on the sides thereof remote from the tubular struts 51 are tubular extensions 61 into which are passed the upper ends of tubes 5 forming a continuation of the tubular struts inside the catch pots. The upper ends of the extensions are closed by removable screw caps c, the tubes 5 being in open communication with the interior of the catch pots, when the apparatus is in use, through the annular space between the tubes 5 and the interior of the extensions 61 and a space between the tops of the tubes 5 and the underside of the caps c. On the movable beam 4 are two hollow bosses 15, 16 situated immediately above the members 13, 14 on the beam 2, the boss 15 extending from the front side of the beam and the boss 16 from the rear side. The interiors of the bosses 15, 16 are in open communication with the passages in the beam 4, which extend respectively from the boss 15 to the left-hand tubular strut and from the boss 16 to the right-hand tubular strut, thereby placing the said bosses in open communication with the respective ends of the U-tube vessel 7 through the tubular struts 51, the tubes 5 and the catch pots 6. The interiors of the bosses 13, 15 are in open communication with one another through the intermediary of an arcuate hollow spring 3 and the interiors of the bosses 14, 16 are in open communication with one another through the intermediary of an arcuate hollow spring 31, the ends of the tubular springs being connected to the respective bosses in any suitable known manner. The tubular springs 3, 31 are disposed symmetrically about the axis of rotation of the beam 4, i. e. the knife edge 8, so that the pressure forces produced by the internal pressure in the tubes and tending to straighten them out, counterbalance one another. As a rule tubular springs comprising from two-thirds to three quarters of a circular turn have sufficient resilience to produce a soft spring action but in some cases the springs may comprise a plurality of spiral or helical turns. In the case of springs comprising a single turn or less, the central axis of the tube extends in a plane perpendicular to the axis of rotation of the beam 4 but with springs comprising a plurality of helical turns this arrangement can only be approximated by arranging the axis of the helix so as to be parallel to the axis of rotation of the beam 4.

The U-tube vessel 7 is half-filled with mercury, the level in the two upright limbs being the same when the vertical tubes 1 are placed into communication with two points at the same pressure as when the apparatus is inoperative. When, however, the two tubes 1 are placed into communication with two points at different pressures, then the levels in the two limbs shift, thereby shifting the center of gravity of the vessel 7 and rocking the beam 4 about the knife edge 8. During the rocking of the beam 4, the bosses 13, 15 and 14, 16 move respectively towards and away from one another, thereby contracting and expanding, respectively, the springs 3, 31.

In order to ensure that the springs 3, 31 will bend as freely as possible and that the stress is uniformly distributed throughout their length, the knife edge 8 must be positioned in accordance with the following principles:

Each of the tubular springs will be subjected to uniform bending stress if two equal couples of forces are caused to act on its ends. The curvature of the spring will then be uniformly altered throughout its length and the free end of the spring will move through a definite and slightly curved path. In the case of a hollow arcuate spring of oval cross-section, a similar uniform bending stress is produced by internal fluid pressure applied inside the spring which tends to straighten out the spring, this movement being utilized in the well-known Bourdon pressure gauge for actuating the indicating pointer. Such a movement of the free end of the spring takes place about an instantaneous or virtual center which, for the limited range of movement concerned in the case of the springs 3, 31, remains practically fixed so that the ends 15, 16 of the springs may for all practical purposes be considered to move in circular paths. Thus, in order that the tubular springs be stressed as uniformly as possible throughout their length, the bosses 13, 14 and 15, 16 are disposed at distances from the knife edge 8 such that the knife edge is situated as accurately as possible at the centre of the circle forming the approximate path of the ends 15, 16 of the springs 3, 31.

The movements of the beam 4 and vessel 7 are transmitted through links 9 to a toothed segment 10, which, through the intermediary of a gear (not shown) turns a pointer, the deflection of which indicates on a suitably graduated scale the pressure difference to be measured. In addition thereto, a rod 11 is pivoted to a lug 111 fixed to the beam 4 and a recording lever 12 is pivoted to the lower end of the hanger 21, the said lever being articulated near its free end at 123 to the free end of the rod 11. Secured to the free end of the lever 12 is a recording device of any known kind e. g. a pencil 121 which is movable over a recording drum 122, whereby a continuous record of the variations in the pressure difference can be produced.

When the apparatus is to be employed for measuring the velocity of steam or other fluids flowing through a pipe, a perforated diaphragm, throttling nozzle or Venturi tube is interposed in the pipe and the tubes 1 are connected up to the pipe, one on each side of the perforated diaphragm or other device interposed in the pipe. The rate of flow of fluids through a pipe is not directly proportioned to the pressure head but to the square root thereof, as is well known. In order to enable the recording apparatus to produce diagrams that can be measured with a planimeter, the recording lever 12 is not secured to the beam 4 but is pivoted to the fixed member 21 and rocked by the rod 11 pivoted to the lug 111 fixed on the beam 4 on one side of the knife edge 8. By suitably proportioning the length of the members 11, 12 and correspondingly arranging the pivots of the rod 11, lever 12 and the point of articulation 123 in relation to the knife edge 8, a rapid increase in the deflection of the lever 12 will take place as the lever moves further from its vertical zero position, this occurring in such a way as to produce a close approximation of the root values of the pressure differences in the record produced by the recording device 121.

In order to enable the apparatus to be transported with the mercury in the vessel 7 in situ and at the same time avoid the risk of any of the mercury running out of the vessel during transport, the upper ends of the tubes 5 are threaded internally to receive closure screws $a$. When the apparatus is to be transported, the caps $c$ are unscrewed and the screws $a$ screwed into the tubes 5, the caps $c$ being then replaced. By this means, communication between the tubes 5 and the catch pots 6 is interrupted. Before the apparatus is put into use, the screws $a$ are removed after unscrewing the caps $c$ which latter are then replaced on the ends of the tubular members 61.

Further, to avoid damage of the beam 4 and the parts associated with it, cam levers $d$ are pivoted to the ends of the beam 2, said cam levers engaging the underside of the beam 4 at the ends thereof, as shown on the right-hand side of Figure 1, when turned upwardly, thereby locking the beam. When the apparatus is put into use, the levers $d$ are rocked outwardly as shown on the left-hand side of Figure 1. When not in use, the U-tube vessel 7 can be clamped by means of an eccentric $f$ which engages the inside of the tube as shown in full lines in Figure 1 but is rotated into the position shown in chain lines when the apparatus is to be used. The members $d$ and $f$ are turned by means of a key $h$ which is adapted to engage the ends of shafts $i$, $i_1$, which project through the rear of the casing 17 and on which these members are respectively fixed. When not in use, the key $h$ is secured on the end of the shaft $i_1$ by means of a screw $g$.

What I claim is:—

1. Apparatus for measuring differences of pressure between two points of a system comprising two hollow stationary supports each communicating with one of the two points between which the difference of pressure is to be determined, a movable beam having two passages therein, means mounting the beam to rock about a horizontal axis, a communicating tube curved to an arc of a circle, mounted on said movable beam and adapted to contain a liquid, the two passages of the movable tubular beam communicating respectively with the two ends of the communicating tube, and two tubular springs, each curved to an arc of a circle extending to at least two-thirds of a complete turn, each of said springs establishing communication between one of the two hollow stationary supports and the adjacent passage of the movable beam, said springs being in planes substantially perpendicular to the axis about which the movable beam rocks, and tending to rock said beam in opposite directions.

2. Apparatus for measuring differences of pressure between two points of a system comprising two hollow stationary supports, a fixed beam carried by said supports, each of the two supports communicating with one of the two points between which the difference of pressure is to be determined, a movable beam having two passages therein, means mounting said beam to rock about a horizontal axis, a U-tube mounted on said movable beam and adapted to contain a liquid such as mercury, the two passages of the movable beam communicating, respectively with the two ends of the U-tube, two tubular springs, each curved to an arc of a circle, each of said springs being clamped at one end to one end of the fixed beam and communicating with the passage in the adjacent end of the movable beam, and said springs tending to rock the movable beam in opposite directions.

3. Apparatus for measuring differences of pressure between two points of a system comprising two hollow stationary supports each communicating with one of the two points between which the difference of pressure is to be determined, a movable beam having two passages therein, means mounting said beam to rock about a horizontal axis, a U-tube mounted on said movable beam and adapted to contain a liquid such as mercury, the two passages of the movable beam communicating respectively with the two ends of the U-tube, and two tubular springs, each curved to an arc of a circle, each of said springs establishing communication between one of the two hollow stationary supports and the passage in the adjacent end of the movable beam, and said springs tending to rock the movable beam in opposite directions, the axis about which the movable beam rocks being so positioned that as the beam rocks the curvature of each of the tubular springs is uniformly altered throughout its length.

4. Apparatus for measuring differences of pressure between two points of a system comprising two hollow stationary supports, a fixed beam carried by said supports, each of the two supports communicating with one of the two points between which the difference of pressure is to be determined, a movable beam having two passages therein and mounted to rock about a horizontal axis, a communicating tube curved to an arc of a circle, mounted on said movable beam and adapted to contain a liquid, the two passages of the movable beam communicating respectively with the two ends of the communicating tube, and two tubular springs, each curved to an arc of a circle extending to at least two-thirds of a complete turn, each of said springs being clamped at one end to one end of the fixed beam, and establishing communication between one of said hollow supports and the passage in the adjacent end of the movable beam, said springs being in planes substantially perpendicular to the axis about which the movable beam rocks, and tending to rock said beam in opposite directions, the axis about which the movable beam rocks being so positioned that as the beam rocks, each of the tubular springs is subjected to substantially a pure bending stress which is uniform throughout its length.

In testimony whereof I have signed my name to this specification.

ALBERT RÖVER.